J. WALTERS.
ANIMAL FEEDING TROUGH.
APPLICATION FILED APR. 8, 1920.

1,358,484.

Patented Nov. 9, 1920.

Inventor,
Jesse Walters, by
G.C. Kennedy,
Attorney.

UNITED STATES PATENT OFFICE.

JESSE WALTERS, OF BLACKHAWK COUNTY, IOWA.

ANIMAL-FEEDING TROUGH.

1,358,484.  Specification of Letters Patent.  Patented Nov. 9, 1920.

Application filed April 8, 1920. Serial No. 372,281.

*To all whom it may concern:*

Be it known that I, JESSE WALTERS, a citizen of the United States of America, and a resident of Blackhawk county, Iowa, in the vicinity of the city of Waterloo, in said county, have invented certain new and useful Improvements in Animal-Feeding Troughs, of which the following is a specification.

My invention relates to improvements in animal feeding troughs, and the object of my improvement is to supply an open top trough of this class with end extensions formed and directed for use in replenishing the trough from either end without disturbing animals while feeding, these extensions also preventing animals from throwing out feed from the ends of the trough.

Figure 1:
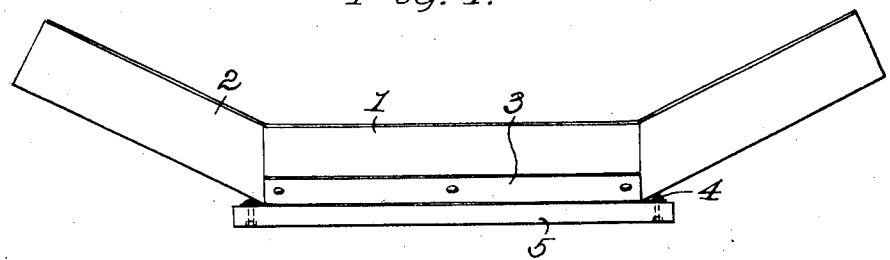
Figure 2:
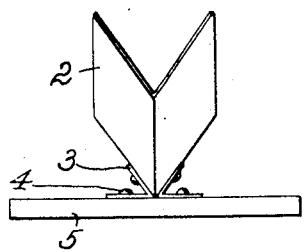
Figure 3:
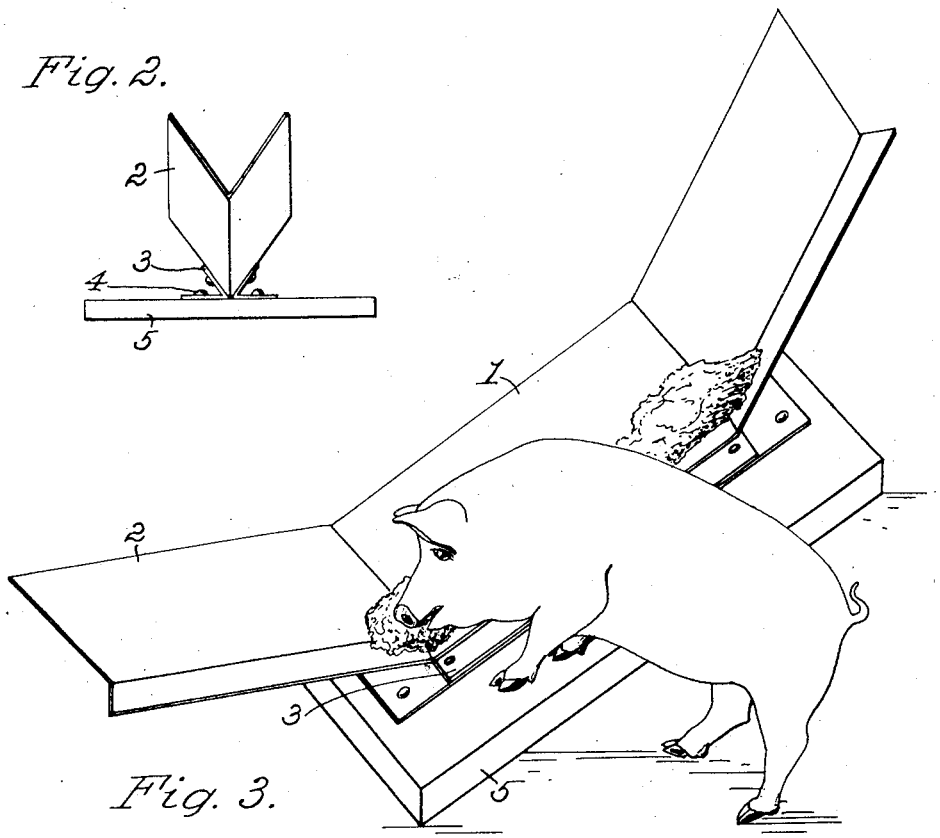

This object I have accomplished by the means which are hereinafter described and claimed, and which are illustrated in the accompanying drawings, in which Figures 1 and 2 are respectively a side and an end elevation of my improved feeding trough, and Fig. 3 is an enlarged perspective view thereof.

My device may be constructed of any suitable material, and be of any desired dimensions. As shown, it is formed of a metal plate, which is shaped to be of V-section, the trough 1 being horizontal, the trough having end extensions 2, which are inclined upwardly at a suitable angle.

The trough is fixedly mounted on a substantial base-block or structure 5 by means of angle-plates 3, which are fastened to both the outside of the part 1 of the trough, and to the top of the base-block by rivets or bolts 4.

When soft, granular, or semi-liquid feed is placed in the trough, a hog or other feeding animal cannot throw the feed endwise out of it, because when the feed is thus cast into the sloping end parts 2, gravity returns it to the trough 1. When animals are feeding, such feed may be deposited in either end part 2, to flow downwardly into the trough 1, without disturbing the animals.

Having described my invention, what I claim as new and desire to secure by Letters Patent, is:

1. An animal feeding trough, comprising an open top trough having its ends bent upwardly obliquely and extending a distance above and beyond the top of the trough, and rigid supporting-means therefor.

2. An animal feeding trough, comprising an open top trough of V-shape cross-section, having its middle part horizontal, and its end parts sloped upwardly and extending a relatively long distance beyond the trough.

3. An animal feeding trough, comprising an open top trough of V-shape cross-section, with its end parts bent upwardly slopingly above the trough, a base, and means for securing the middle part of the trough rigidly to the base.

4. An animal feeding trough, comprising an open top trough, whose middle part is horizontal and its end parts bent obliquely upwardly above the middle part, a base, and angle-plates secured to both the base and the middle part of the trough, to rigidly mount the trough on the base.

Signed at Waterloo, Iowa, this 15th day of March, 1920.

JESSE WALTERS.